June 2, 1936.  M. W. McARDLE ET AL  2,042,953
METHOD OF MAKING SOLE PLATES FOR SADIRONS
Original Filed Feb. 9, 1933  4 Sheets—Sheet 1
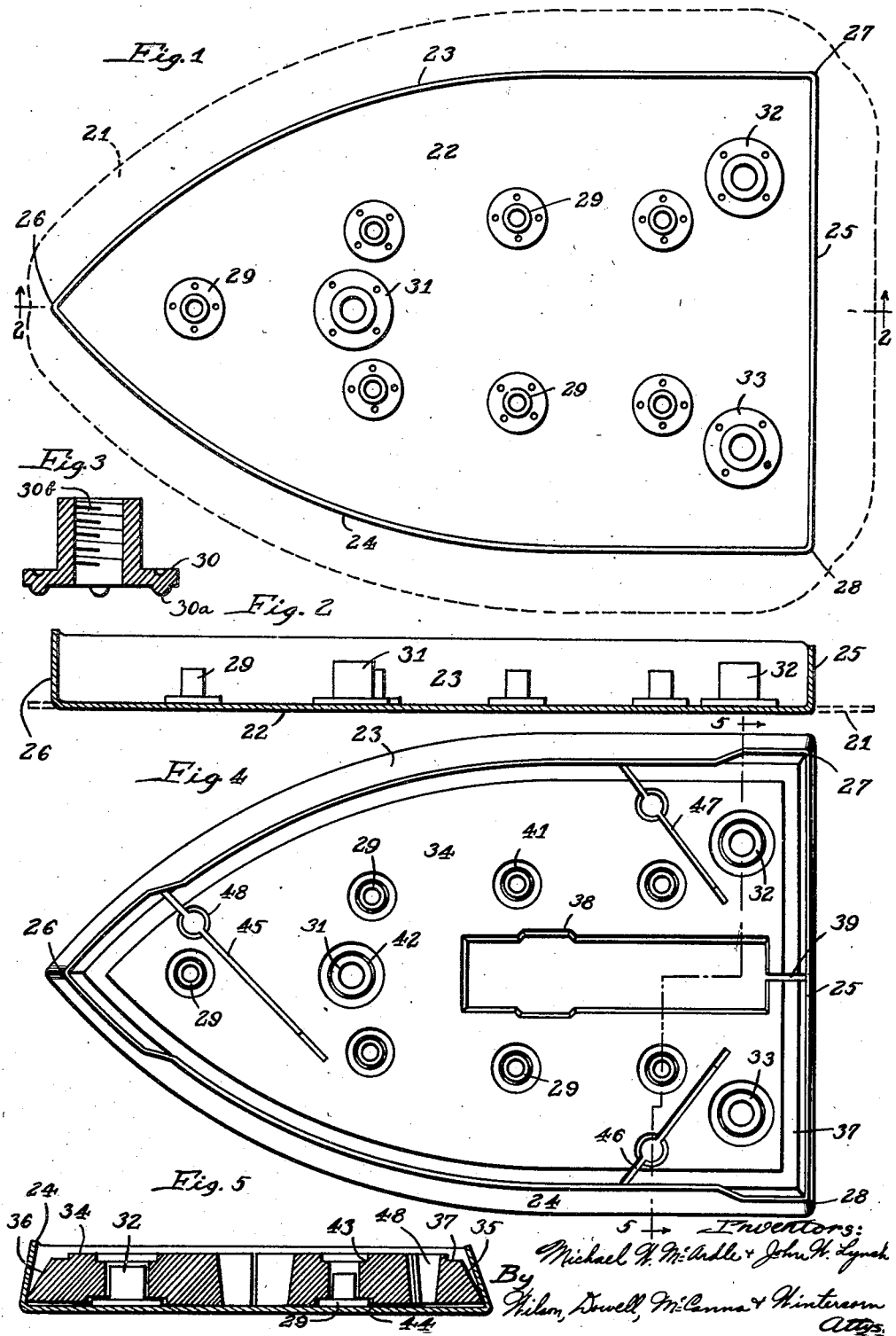

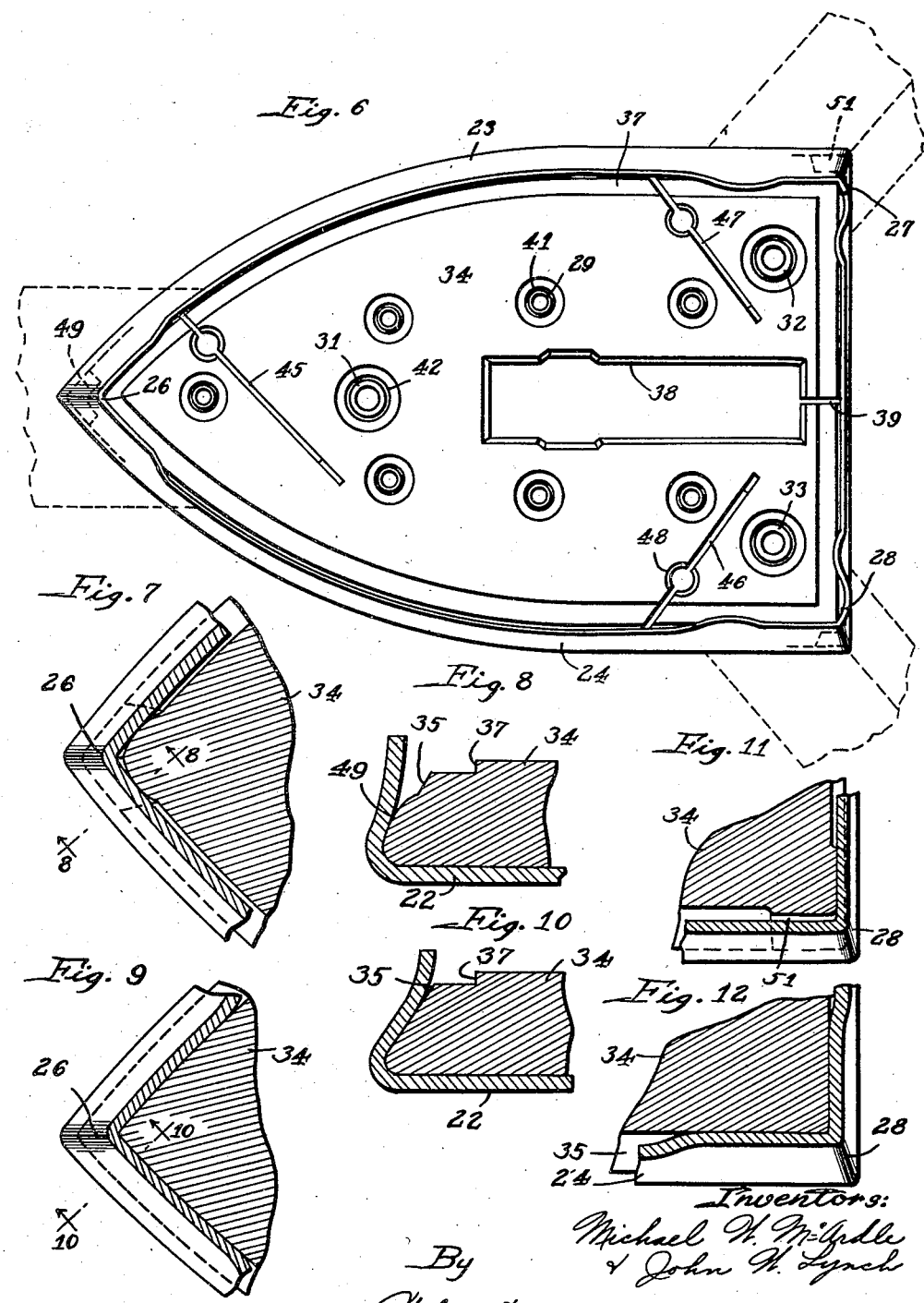

June 2, 1936. M. W. McARDLE ET AL 2,042,953
METHOD OF MAKING SOLE PLATES FOR SADIRONS
Original Filed Feb. 9, 1933 4 Sheets-Sheet 3
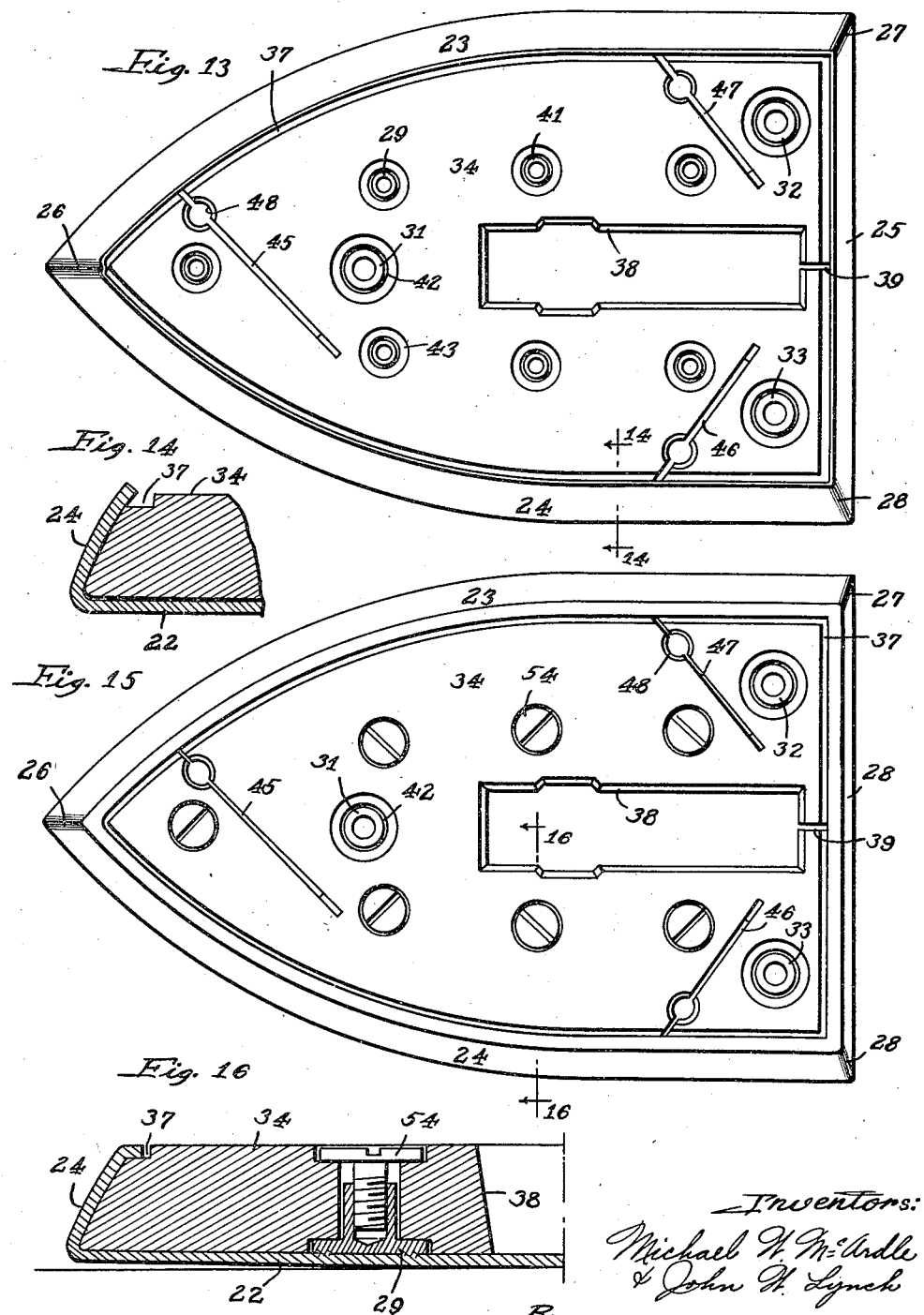
Inventors:
Michael W. McArdle
& John H. Lynch
By
Wilson, Dowell, McCanna & Wintercorn
Attys.

June 2, 1936.  M. W. McARDLE ET AL  2,042,953
METHOD OF MAKING SOLE PLATES FOR SADIRONS
Original Filed Feb. 9, 1933    4 Sheets-Sheet 4
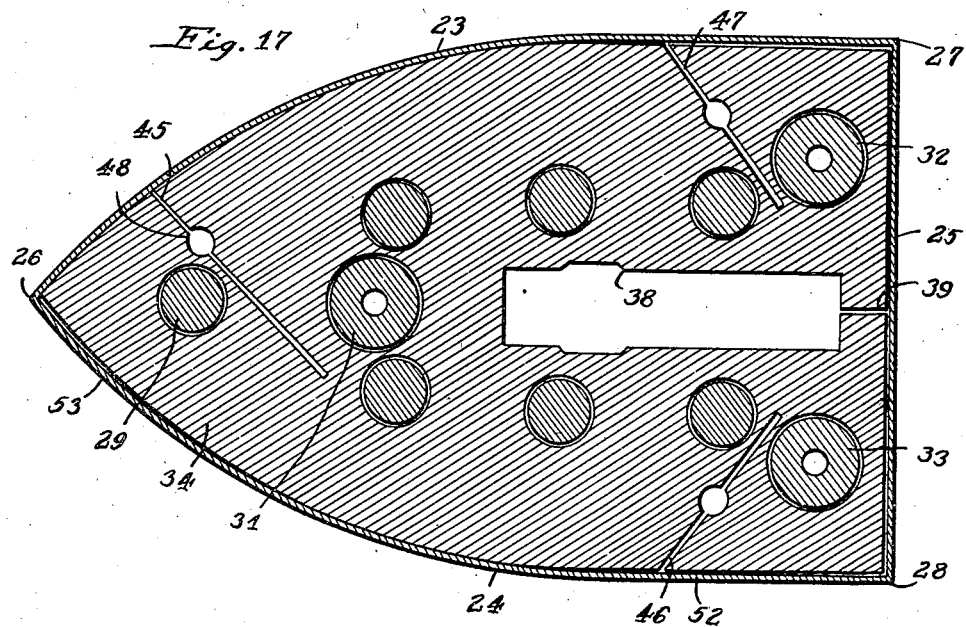
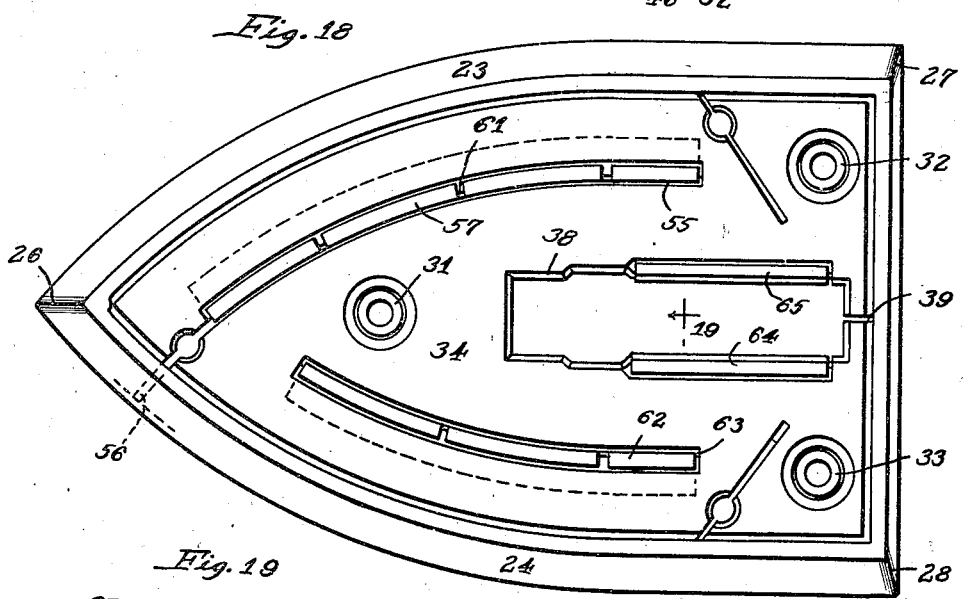
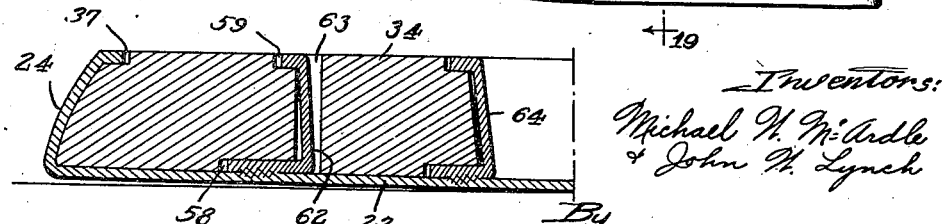

Patented June 2, 1936

2,042,953

UNITED STATES PATENT OFFICE 2,042,953

METHOD OF MAKING SOLE PLATES FOR SADIRONS

Michael W. McArdle and John W. Lynch, Chicago, Ill., assignors to Chicago Flexible Shaft Company, Chicago, Ill., a corporation of Illinois Original application February 9, 1933, Serial No. 655,932, now Patent No. 1,995,035, dated March 19, 1935. Divided and this application August 12, 1933, Serial No. 684,879

12 Claims. (Cl. 76—101)

This invention relates to the manufacture of sadirons and has particular reference to a method for making a composite sole plate therefor.

A purpose of the present invention is to provide a method for making a sole plate having an outer shell of sheet metal and a body or filler which may be of different metal and which is shaped and secured to the shell in a manner to compensate for differences in thermal expansion between the parts and to hold the ironing surface of the shell firmly against the body.

We have also aimed to provide a method for making a light weight sole plate with an outer surface of such hardness as to resist mechanical damage such as scratching and marring under usage to which such articles are normally put.

A further object of the invention is to provide a method for forming a shell of steel or other hard sheet material upon a body of light weight material, such as aluminum, to form a sole plate and for shaping the parts so as to compensate for the effects of the difference in thermal expansion of the parts upon the curvature of the ironing surface of the sole plate.

We have also aimed to provide a method for making a composite sole plate wherein the completed article is brought to a condition such that at no time during the normal operation of the iron will the body exert undue pressure outward against the side walls of the shell.

Other objects and attendant advantages will become apparent to those skilled in the art from the following description and the accompanying drawings, in which—

Figure 1 is a top view of the shell, showing in dotted lines the shape characteristics of the blank from which the shell is drawn;

Fig. 2 is a section on the line 2—2 of Figure 1;

Fig. 3 is a longitudinal section through one of the bosses;

Fig. 4 is a top view of the shell with the body in place showing the shell after the preliminary bending thereof;

Fig. 5 is a section on the line 5—5 of Fig. 4 showing the preliminary bending of the sides of the shell;

Fig. 6 is a top view of the shell and body after the preliminary corner forming operations, showing in dotted lines the manner in which the dies form the corners;

Fig. 7 is a section through the point of the shell and body parallel to the ironing surface showing the relationship of the parts in Fig. 4;

Fig. 8 is a section on the line 8—8 of Fig. 7;

Fig. 9 is a section similar to Fig. 7 showing the relationship of the parts after the die operation shown in Fig. 6;

Fig. 10 is a section on the line 10—10 of Fig. 9;

Figs. 11 and 12 are sections parallel to the ironing surfaces through one of the heel corners showing the relationships of the parts prior and subsequent to the die operations shown in Fig. 6;

Fig. 13 shows the sole plate after the flange of the shell has been completely ironed in against the side walls of the body;

Fig. 14 is a section on the line 14—14 of Fig. 13;

Fig. 15 is a top view of the completed sole plate showing the upper edges of the flanges pressed down against the top of the body and the fillister screws inserted;

Fig. 16 is a section on the line 16—16 of Fig. 15;

Fig. 17 is a section through the sole plate parallel with the ironing surface thereof after the heating step of the method;

Fig. 18 is a top view of a modified form of sole plate, and

Fig. 19 is a section on the line 19—19 of Fig. 18.

This is a division of our copending application Serial No. 655,932, filed February 9, 1933, now Patent No. 1,995,035, dated March 19, 1935.

The present invention deals with the production of a composite sole plate as distinguished from those in which the plate is made from a single piece of metal usually cast to the desired shape. In the past, the common practice has been to cast the sole plate from gray iron or similar metal. The bottom, side wall, and a portion of the top were then ground to remove the irregularities incidental to casting and to further shape and smoothen the casting. Following the grinding it was necessary to thoroughly polish the metal to a high degree of smoothness prior to the plating operations.

These grinding and polishing operations must be largely hand operations and consequently entail a good deal of expense. In addition to the expense involved in preparing such a sole plate, the iron from which it was made was heavy and resulted in a heavy sole plate because of the necessity of having a comparatively thick plate of substantially uniform thickness to satisfactorily distribute the heat uniformly over the entire ironing surface of the sole plate and avoid hot and cold spots thereon. On the other hand, such a sole plate had a number of advantages. The metal was hard and not easily damaged through scratching and could not be easily battered out of shape when used with metal iron rests. Furthermore, the metal was easily plated and took a firm adherent coating of the plating metal.

In the manufacture of light weight irons the trade took to making the sole plate in the old way by making a casting from aluminum or aluminum alloys. While such a sole plate was light in weight, it still possessed the other disadvantages of the cast iron plate, and in addition, was soft and malleable so that it was easily scratched and battered in service. The aluminum plate had the further disadvantage that it was not easily plated, and that the plating, when formed, had a tendency to be cracked and chipped off in service by distortion of the soft metal beneath.

Our composite sole plate possesses the essential advantages of each of these prior plates and eliminates the disadvantages thereof. This is accomplished by making the body portion of aluminum or other light metal and the shell of steel or similar sheet metal. In this manner, we obtain a light sole plate, the outer surface of which is of steel of sufficient thickness and hardness to withstand hard usage without scratching or deforming. By using sheet steel for the shell, we eliminate most of the grinding and polishing operations and obtain a surface which is easily plated. Furthermore, because of the substantial elimination of the grinding and polishing steps, and because of the ease of plating, we are able to produce the composite sole plate at a lower cost than those of the prior art.

One phase of the invention contemplates a method of manufacturing a composite sole plate wherein a sheet metal blank is drawn to produce a shell, means are attached to the shell for securing a body firmly against the bottom of the shell, a filler or body is inserted in the shell, and the flanges of the shell are ironed or formed against the sides and top of the body so as to permanently unite the body and shell. The sole plate is then heat treated to adjust the parts and prevent uneven expansion difficulties.

Referring first to Figure 1, a blank such as shown in dotted lines at 21, is first cut of sheet metal. This blank is then formed by suitable forming dies to a shell having a base 22 and flanged peripheral walls consisting of side walls 23 and 24 and a rear wall 25, the flange being continuous and the walls being connected at the point 26 and at the heel corners 27 and 28. The next step consists in securing to the base of the shell a plurality of wide bottomed bosses such as shown to advantage in Fig. 3. Each of these bosses is provided with a flanged bottom 30 having a plurality of projections 30a arranged to function in the welding of the bosses to the shell. These bosses serve for the attachment of the body to the base of the shell and also for the attachment to the sole plate of the superimposed portions of the iron. Advantageously the bosses may be welded by means of spot welding to the inside of the shell and bosses 29 should be spaced from the side edges of the shell and arranged there along in the manner shown in Figure 1. The bosses 31, 32, and 33, are somewhat larger than the bosses 29 and serve to receive bolts for attaching the super-structure of the iron to the sole plate. The bosses are internally threaded, as shown at 30b, so that a screw may be inserted through the body and into the boss to draw the base of the shell firmly against the lower surface of the body, thereby facilitating the transfer of heat from the body to the base of the shell. Furthermore, the bosses should have a relatively wide area in contact with the base of the shell so as to prevent distortion of the shell upon thermal expansion of the sole plate, as will presently be more fully discussed.

A body 34 is then positioned on the base 22 of the shell within the flange periphery. This body may take a wide variety of forms within the contemplation of the invention. In this instance, it consists of a casting of one piece, though it will be understood that the invention is by no means limited to a one-piece casting since a laminated body such as shown in U. S. Patents 1,749,596 and 1,749,597 issued March 4, 1932, to one of us may also be used. Likewise the body may advantageously be of aluminum or aluminum alloy to provide a light weight sole plate, though here again it will be understood that any suitable metal may be employed. In the form shown in the drawings, the side walls of the sole plate are intended to slope inward from bottom to top and consequently the side walls 35 and 36 of the body are correspondingly sloped and terminated at their upper edge in a marginal recess 37 on the upper surface of the body, this marginal recess being of a thickness to receive the upper edge of the shell flange so as to provide a substantially smooth upper surface on the completed sole plate and to permit a clamping action of the shell upon the body. When the construction of the iron warrants it, the body may also be provided with an opening 38 for the reception of the thermostatic element of the iron, not shown, so that the thermostatic element may be placed in close proximity to the ironing surface of the sole plate. A slot 39 extends from the opening 38 through the heel of the body separating the rear end of the body into two arms which may move toward and away from each other in response to the thermal changes of the iron. The lower surface of the body is curved, laterally and longitudinally, as best shown in Fig. 5, this curvature being such that when the shell is formed around the body and the sole plate heated to the operating temperature, the difference in the rate of expansion of the shell and the body will cause the lower surface of the sole plate to become less convex and approach plainness, it being preferable that the surface still remain slightly convex in order to insure against a possibility of the surface becoming concave on heating and also because the iron appears to operate better under such circumstances. The body 34 is provided with openings 41 for the reception of the bosses 29 and with openings 42 for the reception of the bosses 31, 32 and 33. The openings 41 and 42 are counterbored at top and bottom, as shown at 43 and 44, the counterbore 44 being of a thickness to just receive the wide flanged bottom of the bosses so that when screws are inserted in the bosses with their heads in the counterbore 43, the workman cannot tighten the screws sufficiently to draw in the shell or loosen the weld, nor can thermal expansion of the body accomplish the same thing. The openings 41 and 42 and the counterbores 43 and 44 are of slightly larger size than required for the reception of the bosses and screws, thereby permitting a certain amount of movement between the body and the shell and allowing sufficient room to take care of a different rate of expansion of the various parts. The body is slotted from its periphery inward, as shown at 45, 46 and 47, the slots being adjacent to each corner of the body and openings 48 are positioned in the slots intermediate their ends, these openings being tapered inward from top to bottom of the body. These slots together with the slot 39 lend resiliency or compressibility to the body permitting the body to move inward within itself, as it were, to compensate for thermal expansion thereof so that proper expansion adjustments between the parts may be brought about by the subsequent step of heating the sole plate. When the body is of aluminum or other soft metal we have found it advisable to provide protrusions on the body, such as shown at 49 and 51, to prevent distortion of the side walls of the body when the corner forming dies press the flange of the shell against the body, these protrusions flattening out during this die operation to provide a smooth side wall, as shown in Figs. 9 and 12.

It is desirable that the sides of the sole plate be at an acute angle with respect to the ironing surface thereof because of the greater facility with which the edge of the iron can be moved under ruffles, buttons, and other projections when ironing. The forming of the shell along these acute angled sides presents a difficult problem and one phase of our invention lies in the steps of the method whereby this is accomplished. These steps involve the forming of the shell directly on the body, the sides of the body offering lateral support for the forming of the shell which is done under considerable pressure. When a body of soft material is used it is advisable to provide the protrusions 49 and 51 to prevent the side walls of the body from being pressed out of the desired shape by the pressure of the die operations at the corners of the shell.

Referring again to the forming operations, the body is inserted in the shell with the bosses in the openings 41 and 42. The assembled sole plate is then subjected to a die operation to bend the flanged side walls 23 and 24 from the position shown in Figure 1 to the position shown in Fig. 4, the side walls of the body providing lateral support during the forming operation, and pins preferably on the dies being inserted in the openings 48 of the slots to prevent these slots from collapsing or closing during the die operation. The openings 48 are tapered to facilitate the entry of the pins. This die operation also serves to partially form the corners of the shell, as shown in the latter figure. Care is taken, however, to prevent the corners from being bent up too far by the insertion of wedges between the body and the flange at the corners. The relative amount of forming of the sides and the corners is shown to advantage in Fig. 5.

The result of the next die operation is shown in Fig. 6 and the manner of performing this operation is shown diagrammatically by the dotted lines representing portions of the dies. In this instance, the dies operate at each corner bringing the lower part of the flange up against the corners of the body. At the same time, the protrusions 49 and 51 are flattened out or ironed into the body by the force of the die operation. Figs. 7 and 8 show the point of the sole plate prior to this die operation, whereas Figs. 9 and 10 show the point subsequent to the die operation clearly showing the manner in which the sheet metal flange is pressed firmly against the side walls of the body. Likewise, Figs. 11 and 12 show one of the heel corners before this die operation and subsequent thereto.

After the corners of the shell have been brought up against the body, as shown in Fig. 6, the sole plate is subjected to the action of an additional die wherein the side walls 23, 24 and 25 of the flange, together with the upper portions of the corners thereof, are pressed inward, the metal being simultaneously contracted along the sides of the flange during this die operation, the operation resulting in a structure such as shown in Figs. 13 and 14. After this die operation there may be some clearance in places between the flange and the side walls of the body portion such as shown in Fig. 14 and there would usually be a certain amount of clearance between the base of the shell and the bottom of the body along the periphery, as shown in this figure due to the curvature of the bottom of the sole plate.

A subsequent die operation carried out under considerable pressure converts the structure shown in Figs. 13 and 14 into that shown in Figs. 15 and 16 during which operation the base of the shell is brought firmly against the bottom of the body throughout its entire surface to bring the base of the shell convex both longitudinally and transversely, the flange of the shell is ironed closely against the side walls of the body portion and the upper edge of the flange is bent down into the recess 37, thus completing the forming operations of the sole plate. In each die operation, pins are inserted in the openings 48 in the slots 45, 46 and 47 to prevent the collapse or closing of these slots under the pressure of the dies.

In many instances, a sole plate made in accordance with the method so far described, will prove satisfactory, the slots in the body compensating sufficiently for the differences in expansion of the body and shell. However, it has been found that frequently when an iron embodying such a sole plate is put into service small cracks will develop in the shell directly at the corners due, doubtless, to the difference in expansion between the body and the shell, the body exerting undue pressure against the side walls of the shell. This condition is particularly aggravated when the shell is made of sheet iron and the body of aluminum or aluminum alloy, the difference in expansion of these two metals tending to break the corners of the shell. We have discovered, however, that if the sole plate, as it comes from the last die operation, is placed in an oven or furnace and heated to a temperature substantially at or preferably slightly above the maximum temperature reached by the sole plate during normal operations, that is, above about 600° F., and preferably about 800° F. the slots 45, 46 and 47 will become partly closed, as shown in Fig. 15, thus apparently leaving space between the side walls of the shell and the body for the normal expansion of the body during the use of the iron. This condition is illustrated in Fig. 17 wherein the numeral 52 indicates the space adjacent to the heel corners of the iron resulting from the distortion of the body by the heat treatment, whereas the numeral 53 designates the space near the point of the iron formed in the same manner. We wish it to be understood that Fig. 17 is merely illustrative of the principle involved and is not to be construed as a limitation as to the precise relationships between the body and the shell which corrects for the difference in expansion between the two metals.

After the heat treatment of the sole plate and after parts have returned to normal temperature, (the corner portions are in the displaced condition shown in Fig. 17), fillister head screws 54 are inserted in the bosses 29, the heads of the screws passing into countersinks 43 to provide a substantially level upper surface for the sole plate, the screws being drawn up tight, thereby drawing the base of the shell firmly against the lower side of the body to maintain intimate contact therebetween for maximum heat transfer between the parts.

Figs. 18 and 19 show an additional way in which the base of the shell may be held firmly against the bottom of the body. In this instance, a curved slot 55 is formed in the body substantially evenly spaced from one edge of the body throughout its length. If desired, this slot may be caused to intersect the periphery of the body as shown at 56 to form one of the desired expansion slots. An angle iron strip 57 is welded, or otherwise attached, to the upper surface of the base of the shell and projects upward through the opening 55, the body being provided with a countersink 58 for the purpose of receiving one side of the strip. The upper edge of the strip is then bent over into a countersink 59 on the top side of the body, thus holding the base of the shell firmly up against the body. It is desirable that the opening 55 be of such width as to permit the strip to rest at a slight angle with respect to the vertical, as shown in Fig. 19, so that upon expansion of the body the strip may spring sidewise. The upper edge of the strip may advantageously be slotted, as shown at 61, to give greater elasticity. Likewise, a strip 62 is secured in a complemental slot 63 spaced from the opposite edge of the body. If desired, similar strips 64 and 65 may be positioned in the well 38 and clamped over the edge thereof, as shown in the drawings. In this manner, the base of the shell will be held firmly against the lower surface of the body to insure a maximum of contact therebetween and thus facilitate the transfer of heat from the body to the base.

Referring now more particularly to Figs. 15 and 16, attention is directed to the fact that we have provided an improved composite sole plate wherein means are provided for accommodating the structure for differences in thermal expansion between the body and the shell. This difference in expansion will, in part, be accounted for by the difference in temperature normally existing between the body and the shell, the heating element of the iron normally being supported directly on the body whereas the shell is exposed to the cooling effects of the air. For this reason, the body will normally be at a higher temperature than the shell, and consequently will expand to a greater extent when the iron is in service. When the body is made of aluminum or aluminum alloy, this condition is aggravated by the greater coefficient of expansion of the aluminum. However, by providing the slots in the body, and subjecting the sole plate to the heat treatment previously described, we are enabled to bring about a condition in the sole plate such that the difference in expansion between the component parts thereof is rendered harmless and at no time in the normal operation of the iron will the body exert undue pressure outwardly against the side walls of the shell. This feature is of greatest advantage when the sole plate forms a part of an automatic iron wherein the ironing surface is maintained at a substantially uniform normal operating temperature. Under such circumstances the sole plate is preheated to a certain higher temperature to allow a safety factor for overrun in temperature of the iron. Likewise, by providing the body with a convex face we provide means for counteracting the normal tendency of the shell to curl since the lateral expansion of the aluminum body will be greater than the expansion of the steel shell, heating of the sole plate will bring about the straightening of the convex surface to nearly a flat surface on the bottom of the sole plate, when the iron is in service.

Attention is also directed to the shape of the bosses, which are welded or attached to the base of the shell. It will be seen that these are provided with flanged or disc-like bottoms so that they cover a relatively large area on the bottom of the insert. Likewise, the body is counterbored to a depth just sufficient to receive this disc-like bottom of the flange. Thus, when the body thickens through expansion, the bottoms of the bosses merely draw up against the body, the strain caused by the expansion thus being taken between the fillister head of the screw and the base of the boss. If, instead of the large bases, straight bosses or nipples were used without any flange, the body would, when on heat, exert an upward pressure on the fillister head screws, due to the expansion of the metal and would pull the straight round boss up through the hole of the body, thus causing the outer shell to follow through the hole, which would show a small depression on the outer surface of the base of the shell. On the other hand, with our present construction, this becomes impossible and it is impossible to visually detect from the outside of the sole plate the points at which the bosses are welded to the shell.

Through this construction we are enabled to produce a relatively light sole plate having the advantage of the greater heat conductivity of aluminum and yet retain the surface hardness resulting from the steel shell. In other words, when a steel sole plate is used, the sole plate is relatively heavy though it possesses the requisite hardness, whereas when an aluminum sole plate is used the article is light in weight, possesses greater heat conductivity than the steel article but is so soft that it is readily scratched or deformed. We have succeeded in combining the advantages of these two forms of sole plate and in eliminating the disadvantages of each. Furthermore, through our construction we have eliminated the necessity for a large amount of polishing and grinding both on the ironing surface of the plate and the side walls thereof, thus materially reducing the cost of manufacture of the sole plate.

By the method disclosed, we have succeeded in forming the steel shell around the body by means of conventional low cost forming operations, and through the introduction of a heat treating step have succeeded in so conditioning the parts as to eliminate the danger of cracking the shell due to the expansion between the various parts of the structure.

While we have thus described and illustrated a specific embodiment of our invention, we are aware that numerous alterations and changes may be made therein within the spirit of the invention and the scope of the appended claims, in which—

We claim:

1. The method of making sadiron sole plates comprising forming a sheet metal shell having a peripheral flange defining a bottom and upstanding sides and corners, securing a plurality of bosses to the bottom of said shell, inserting a cast metal body in said shell having openings for the reception of said bosses, partially crimping the sides of said shell against the sides of said body, forming the corner portions of said shell against the corners of said body, forming the entire edge of the shell against the body, thereafter heating the article to bring about expansion adjustments between the parts, and inserting screws through said body into said bosses to hold said shell against the bottom of said body.

2. The method of making a sadiron sole plate comprising forming a sheet metal shell, enclosing therein a previously formed cast metal body having inwardly formed spaces rendering the body collapsible within limits under peripheral pressure of the shell, and thereafter, and prior to assembly in an iron, heating the sole plate to a temperature substantially at that to which heated when in service whereby to cause expansion adjustments between the parts of the sole plate.

3. The method of making a sadiron sole plate comprising forming a sheet metal shell having an upstanding peripheral flange defining a bottom and upstanding sides and corners, inserting therein a body having recesses rendering the body partially collapsible under peripheral pressure of the shell and having side walls sloping inwardly from bottom to top, bending the flange of said shell intermediate the corners thereof inward against said sloping side wall and simultaneously partially forming the corners thereof, thereafter bringing the flange at the corners against said sloping side walls, then pressing the entire flange against said side walls, thereafter bending down the top edge of said flange against the top of said body, and then heating the sole plate to a temperature above about 600° F. to bring about expansion adjustments between the body and the shell.

4. The method of making a sadiron sole plate comprising forming a sheet metal shell having an upstanding peripheral flange, inserting therein a body having diagonally positioned slots near each corner thereof, performing a series of forming operations on said shell to form the latter along the bottom, sides, and a portion of the top of said body while simultaneously preventing the closing of said slots during said operations, and thereafter heating the sole plate to a temperature of about 800° F.

5. The method of making a sadiron sole plate comprising forming a sheet metal shell having an upstanding peripheral flange, attaching body securing means to the base of said shell, inserting in said shell a body having openings for the reception of said body securing means and diagonally positioned slots near each corner thereof, performing a series of progressive forming operations on said shell to form the latter against the bottom, sides, and a portion of the top of said body while preventing the closing of said slots, heating the sole plate to a temparture substantially that to which heated when in service to partially close said slots and bring about expansion adjustment between the parts, and then attaching said body securing means to said body to maintain the parts in their adjusted positions.

6. The method of making a sadiron sole plate comprising forming a sheet metal shell having an upstanding peripheral flange, inserting therein a body of metal softer than said shell having protrusions on the sides thereof near the corners, performing a series of progressive forming operations on said shell to form the shell along the bottom, side walls, and a portion of the top of said body, said operations including a step wherein dies press said shell against the corners of said body and flatten out the protrusions thereon, said protrusions serving to prevent undesirable distortion of said body by said die operation.

7. The method of making a sole plate for sadirons of the type having means for controlling the service temperature thereof comprising forming a sheet metal shell having a bottom and an upstanding peripheral flange, inserting therein a body having inwardly inclined sloping side walls and a bottom curved convexly laterally and longitudinally, and forming said shell against said body with the bottom and flange of the shell in surface contact with the body to impart a convex curvature to the bottom of the shell.

8. The method of making sadiron sole plates comprising forming a sheet metal shell on a body portion having annularly spaced slots, heating the resulting article to a temperature at least about that to which said sole plate is heated when in service to bring about expansion adjustments between the parts and thereafter attaching the body to the shell.

9. The method of making sadiron sole plates comprising forming a sheet metal shell having a bottom and an upstanding marginal flange, inserting therein a body portion having annularly spaced slots, forming the flange against the sides of the body portion, heating the composite structure to a temperature at least about that to which heated in service to bring about expansion adjustments between the parts and securing the bottom of the shell against the body portion after such adjustment.

10. The method of making a sadiron sole plate comprising forming a sheet metal shell having an upstanding peripheral flange defining a bottom and upstanding sides and corners, inserting therein a body having side walls sloping inwardly from bottom to top and having annularly spaced slots adapted to partially collapse upon thermal expansion of the body, bending the flange of said shell intermediate the corners thereof inward against said sloping side wall and simultaneously partially forming the corners thereof, thereafter bringing the flange at the corners against said sloping side walls, then pressing the entire flange against said side walls, thereafter bending down the top edge of said flange against the top of said body, heating the sole plate to a temperature above about 600° F., and thereafter securing the body to the bottom of the shell.

11. The method of making a sadiron sole plate comprising forming a sheet metal shell having an upstanding peripheral flange, inserting therein a body having annularly spaced slots, inserting means in said slots for preventing their collapse, performing a series of forming operations on said shell to form the latter along the bottom and sides of said body, removing said means from the slots, heating the sole plate to a temperature of about 800° F., and thereafter securing the shell to the bottom of said body.

12. The method of making sadiron sole plates comprising forming a body member having recesses therein rendering the body partially collapsible under peripheral pressure enclosing said body member in a sheet metal shell to form a composite sole plate, and thereafter heating the article to a temperature at least equal to about the temperature to which said sole plate is heated when in service whereby to bring about expansion adjustments between the parts.

MICHAEL W. McARDLE.
JOHN W. LYNCH.